May 7, 1963

C. K. NELSON ETAL 3,088,638

BAFFLE TUBE AND EXTRUDER

Filed Sept. 28, 1959

INVENTORS.
CHRISTIAN K. NELSON
CHARLES W. MELTON
THOMAS L. JERNIGAN by their attorney
Robert B. Buckley May 7, 1963 C. K. NELSON ETAL 3,088,638
BAFFLE TUBE AND EXTRUDER
Filed Sept. 28, 1959 3 Sheets-Sheet 2

INVENTORS.
CHRISTIAN K. NELSON
CHARLES W. MELTON
THOMAS L. JERNIGAN
by their attorney
Robert B. Buckley May 7, 1963   C. K. NELSON ETAL   3,088,638
BAFFLE TUBE AND EXTRUDER
Filed Sept. 28, 1959   3 Sheets-Sheet 3

INVENTORS.
CHRISTIAN K. NELSON
CHARLES W. MELTON
THOMAS L. JERNIGAN
by their attorney
Robert B. Buckley

United States Patent Office 3,088,638
Patented May 7, 1963

3,088,638
BAFFLE TUBE AND EXTRUDER
Christian K. Nelson, Charles W. Melton, and Thomas L. Jernigan, all of Henrico County, Va., assignors to Eskimo Pie Corporation, Richmond, Va., a corporation of Delaware
Filed Sept. 28, 1959, Ser. No. 842,939
8 Claims. (Cl. 222—478)

This invention relates to the extrusion of fluid materials. More particularly, this invention relates to an improved, efficient extruder for frozen desserts and a baffle tube for distributing fluid materials, such as frozen dessert, in an effective manner.

Heretofore, apparatus has been provided for extruding frozen desserts. Such devices have included extrusion nozzles having apertures of the desired shape of the frozen dessert being formed. The frozen dessert is forced from a supply into the nozzle and out through the aperture. The shape of the aperture determines the shape of the product, such as a rectangular bar, heart-shaped bar, et cetera. A continuous column of frozen dessert is extruded from the aperture of the nozzle.

This column of frozen dessert is periodically severed into bars by a pair of electrically-heated severing wires that are synchronously reciprocated to swiftly and cleanly sever the bars successively from the continuous column of ice cream.

In some prior ice cream extruders, the problem has been encountered that the ice cream, when fed to the extrusion nozzle, fails to fill uniformly the cross sectional area of the nozzle. Thus, the column of ice cream does not fill out the corners of the nozzle and does not assume the shape of the nozzle as desired. The ice cream bars thus produced do not have the desired shape, and are frequently non-uniform.

Heretofore, some attempts have been made to solve this problem. In some prior devices, the nozzle has been designed with an enlarged upper portion and a restricted aperture at its lower end. As the stream of ice cream is forced downwardly from the enlarged upper portion, the stream, being compressed into a smaller cross sectional area of flow, is pushed into the corners of the aperture so as to assume the shape of the aperture. Such devices are uneconomical of space because of the enlarged upper nozzle portions.

The present invention includes an efficient, economical extruder for frozen desserts and a baffle tube forming a part of the extruder. The extruder of the invention includes a baffle tube so constructed as to fill uniformly the entire cross sectional area of the nozzle with frozen dessert. A continuous column of frozen dessert passes outwardly from the nozzle and is severed into uniform bars having shapes determined by the nozzle. The need for enlarged portions of the nozzle is eliminated and economy of space is achieved.

By the construction of the extruder of the invention, a plurality, as three or four, of nozzles can be placed closely adjacent each other and deliver bars in side-by-side relationship to a conveyor that carries the bars to further operations, such as chilling, enrobing with chocolate and wrapping. Among the materials which can be extruded with the extruder of the invention are ice cream, ice milk and sherbet.

According to the invention, available cylindrical pipe is converted to a baffle tube capable of directing frozen dessert in various directions so as to uniformly fill the nozzle. There is thus provided an efficient, economical method for forming the baffle tubes.

Machinery for handling edibles must meet standards of cleanliness set down by health boards and health commissions of states and local municipalities. Apparatus having internal welds frequently has pits and cracks in the welds which collect dirt and are likely to cause the health board or commission to disapprove of machinery containing such internal welds. As hereinafter described and illustrated, the extruder of the invention can be constructed without internal welds to avoid the foregoing objections.

For a better understanding of the invention and its other objects, advantages and details, reference is now made to the present preferred embodiments of the invention which are shown, for purposes of illustration only, in the accompanying drawings.

In the drawings:

in FIG. 5 the pipe is rotated 90 degrees from the positions illustrated in FIGS. 1 to 4 and 6;

Figure 7:
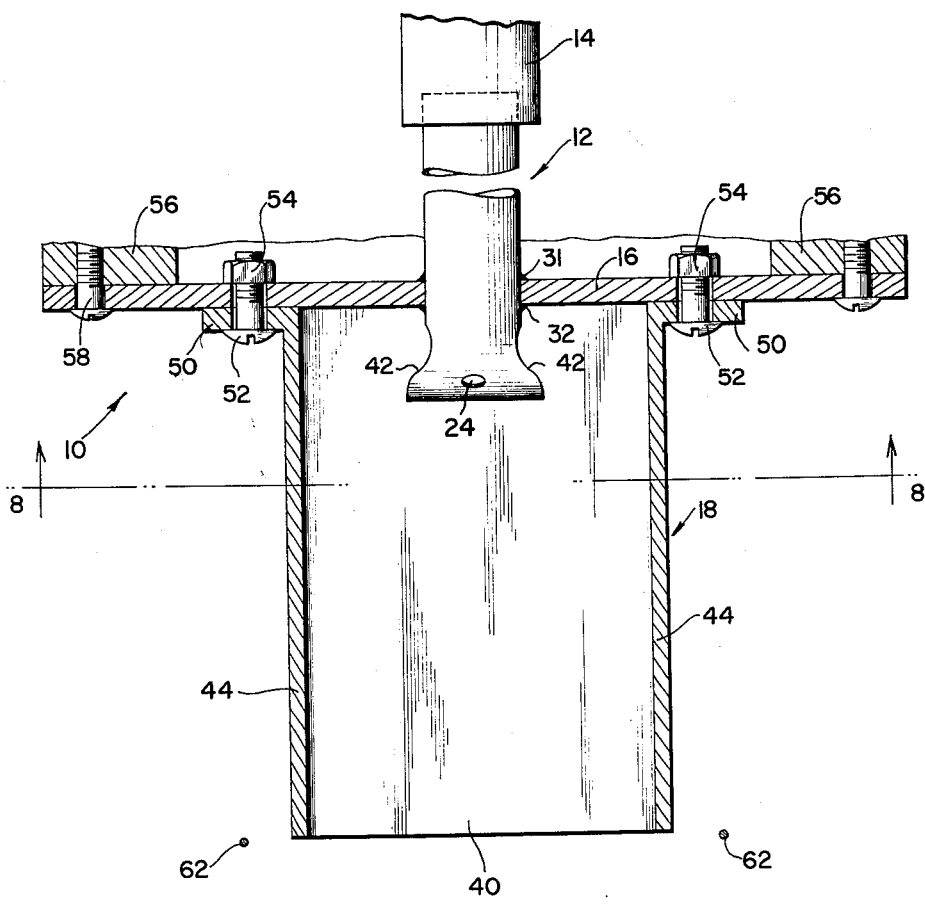
FIG. 7 is a vertical section through an extruder according to the invention incorporating the baffle tube formed as shown in FIGS. 1 to 6 and illustrating wires for severing the column of ice cream into bars and the conveyor for carrying the bars to further processing.
Figure 7:
Figure 8:
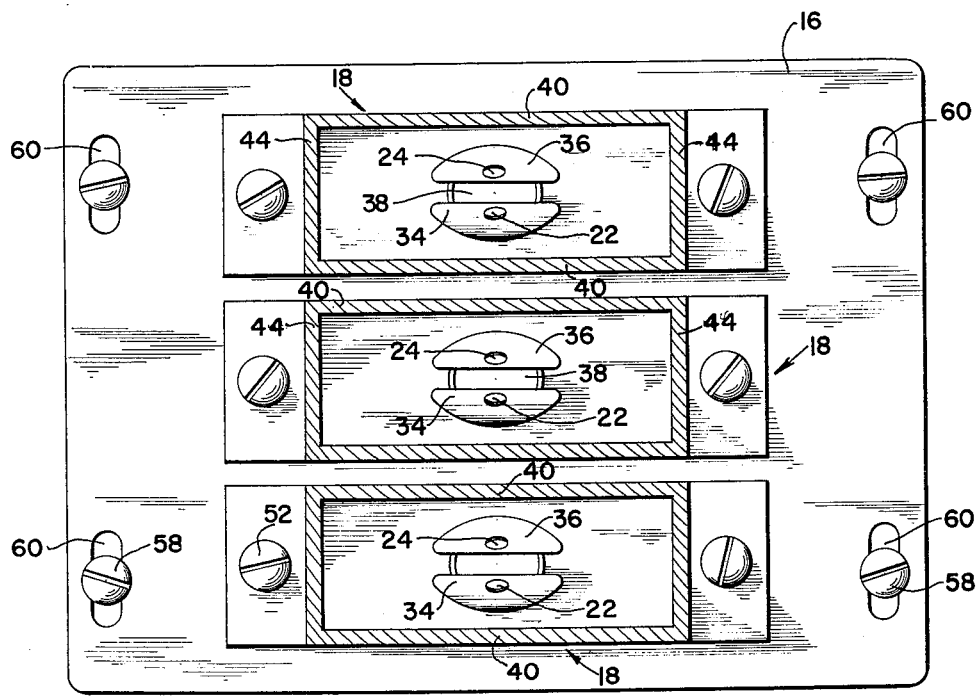
FIG. 8 is a horizontal section taken along the line 8—8 in FIG. 7 and showing three inlet tubes each surrounded by a nozzle and incorporated into an extruder; and, FIG. 9 is a fragmentary view, partly in elevation and partly in section, of another present preferred embodiment of a baffle tube according to the invention.

Referring to FIGS. 7 and 8, the extruder generally indicated by the numeral 10 includes three inlet conduits or baffle tubes 12 each receiving ice cream under pressure from a hose 14. Each hollow baffle tube 12 extends through an aperture in support plate 16 and has its lower end opening into the interior of a nozzle 18.

Figure 1:
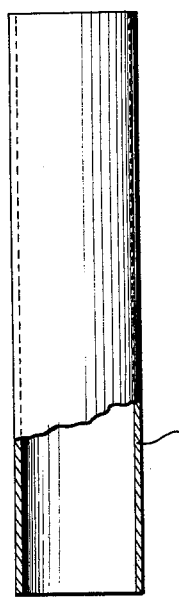
FIGS. 1 to 6 illustrate successive steps in carrying out the method wherein a cylindrical pipe of stainless steel is formed into a baffle tube for an ice cream extruder.
Figure 2:
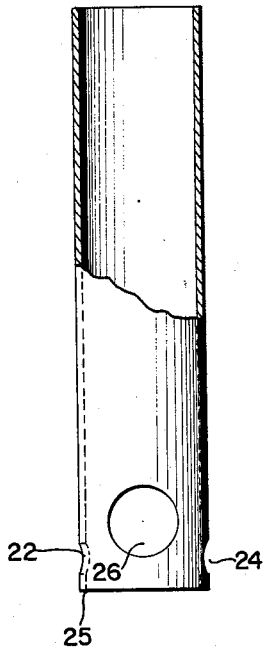

Each inlet tube 12 is formed with outlet apertures constructed to direct streams of ice cream to fill uniformly the entire cross-sectional area of the interior of nozzle 18. Each inlet tube 12 is formed from a pipe 20, formed of stainless steel, as seen in FIG. 1, having a diameter of about 1 inch. For directing the ice cream toward the sides of nozzle 18, two diametrically-opposed small orifices 22 and 24 are drilled through the lower portion of pipe 20, as seen in FIG. 2. The orifices 22 and 24 have a diameter of about ¼ inch and have their centers spaced about ¼ inch above the lower edge 25 of pipe 20. Similarly, for directing the ice cream toward the ends of nozzle 18, two diametrically-opposed large holes 26 and 28 are drilled in the lower portion of pipe 20. The holes 26 and 28 have diameters of about 9/16 inch and have their centers spaced about 17/32 inch above the lower edge 25 of pipe 20.

While the orifices 22 and 24 and the holes 26 and 28 provide for directing ice cream to the outer periphery of the interior of nozzles 18, other apertures are provided for the feeding of ice cream to the center of the interior of nozzles 18 to achieve a substantially-homogeneous column of ice cream in each nozzle. To provide for this flow of ice cream to the center of the nozzle 18, two diametrically opposed cuts 30, about 1/16 inch wide, are formed, as by a hand saw, to connect the ports 26 and 28 with the lower edge 25 of the pipe 20, as seen in FIG. 3.

Figure 3:
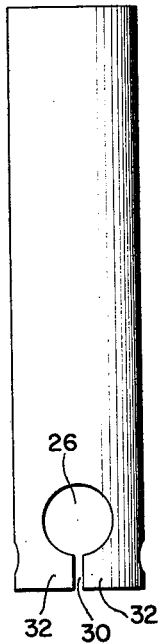
Figure 4:
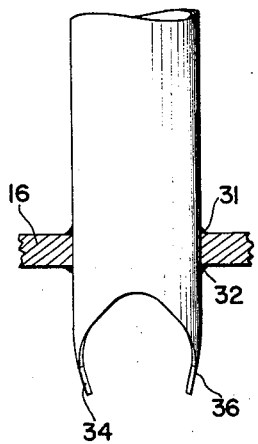

Next, the drilled and sawed pipe 20 shown in FIG. 3 is inserted in a mating aperture formed in the plate 16, as seen in FIG. 4. Then, electric welding is employed to secure the pipe 20 to the plate 16 along circular weld lines 31 and 32. As little welding material as possible is employed so as to insure a joint free of crevices.

Figure 5:
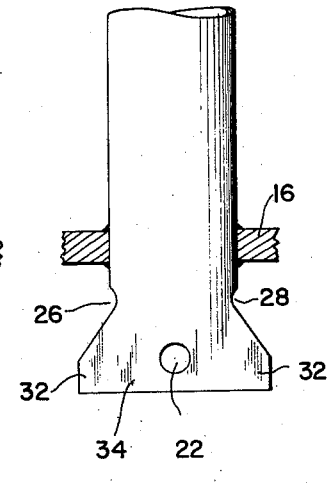
Figure 6:
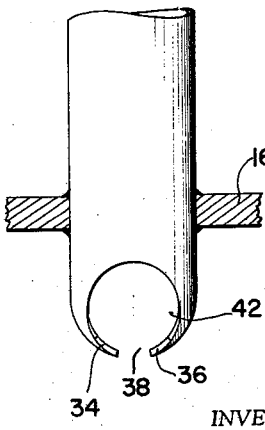

Ears 32, formed on both sides of slots 30, are then bent outwardly and the adjacent portions of tube 20 are bent to form two deflector plates 34 and 36 each having a substantially straight lower edge, as seen in FIGS. 4 and 5. The deflector plates 34 and 36 are then formed and bent to achieve the final configuration shown in FIGS. 6, 7 and 8, wherein the deflector plates 34 and 36 have their lower edges straight and spaced apart about ¼ inch to provide slots 38 aligned with the axis of tubes 20 for delivering ice cream to the center of the interior of nozzles 18. The slots 38 define end openings within the confines or boundary of the extended cross-section of the upper cylindrical pipe portion 20 of each inlet pipe 12, said end openings being adapted for directing fluid material outwardly from tubes 12 in directions parallel to the axes of the tubes.

As seen in FIG. 8, each orifice 22 is located in a curved portion of the deflector plates 34 and 36. The axis of each orifice 22 is directed obliquely downwardly and toward the side walls 40 of each nozzle 18 so as to direct ice cream outwardly toward the side walls 40.

The finished baffle tube 12 also has two opposed ports 42, each of about ¾ inch diameter, for directing streams of ice cream toward the end walls 44 of each nozzle 18. The increased width of the deflector plates 34 and 36, provided by the bending of the ears 32, produces a greater baffling or deflecting action to direct the ice cream to uniformly engage the corners of the interior of the nozzle 18 and uniformly engage the end walls 44.

Thus, it will be seen that the invention provides a baffle tube having slots, orifices, ports and deflector plates for distributing various fluid materials and for uniformly filling a nozzle with ice cream.

Referring to FIGS. 7 and 8, each nozzle 18 has flanges 50 extending sidewardly from end walls 44 and releasably secured to plate 16 by bolts 52 extending through registering holes in the flanges 50 and plate 16. Nuts 54 threadedly engage the upper ends of bolts 52. The plate 16 is releasably secured to supports 56 by bolts 58 extending through slots 60 formed adjacent the edges of the plate.

A column of ice cream issues from the lower end of nozzle 18. A pair of heated wires 62, seen in FIG. 7, are reciprocated toward and away from each other at spaced intervals to slice or sever the column of ice cream into individual bars that fall onto moving conveyors 64. The speed of conveyor 64, the speed of the column of ice cream passing downwardly through nozzle 18, and the frequency of reciprocation of wires 62, are coordinated so as to insure that the conveyor 64 will move a set of ice cream bars from beneath the nozzles 18 before the next set of sliced bars falls onto the conveyor.

As seen in FIG. 8, the extruder has the advantage that it is not necessary to form bulbous enlarged portions in the nozzles 18. The inner cross sectional area of the nozzle is constant from top to bottom. Thus, the three nozzles 18 can be mounted closely adjacent each other. Because of this construction, three ice cream bars are formed by each motion of severing wires 62. These three ice cream bars fall closely side-by-side onto the conveyor 64. This results in efficient utilization of the space on conveyor 64 as the conveyor moves the bars through a subsequent chilling step.

Thus, the invention provides an ice cream extruder constructed with baffle tubes for delivering ice cream uniformly to the entire cross sectional area of nozzles, whereby the lower ejection ends of the nozzles can be located closely adjacent each other with resultant increase in the ratio of productivity to space required.

Figure 9:
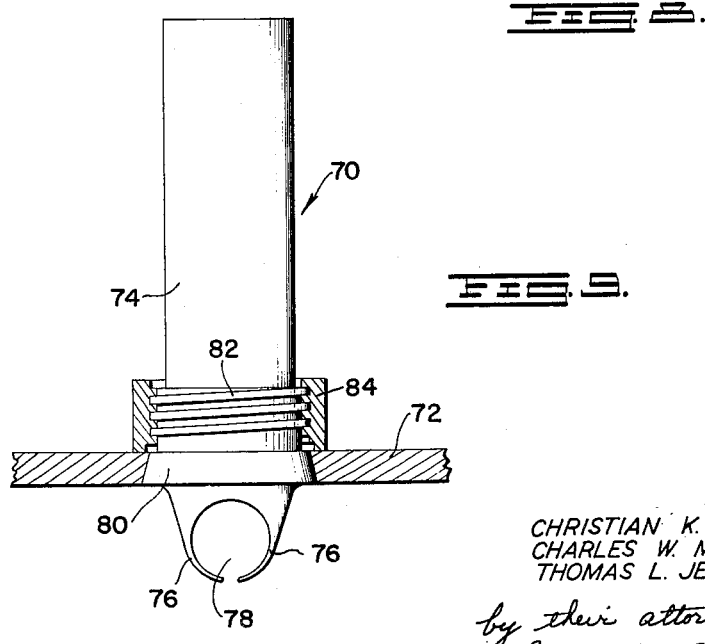

Another present preferred embodiment of the baffle tube of the invention is illustrated in FIG. 9. No dirt-collecting welds are required to secure the baffle tube 70 to the plate 72. The baffle tube 70 includes a cylindrical portion 74, and a lower end including deflector plates 76 forming ports 78 and orifices (not shown) similar to those illustrated in FIGS. 5 to 8. A collar is welded to the outer surface of the cylindrical tube portion 74 and includes a lower beveled portion 80 releasably engaging an oppositely-beveled aperture in plate 72. The collar also includes a square-threaded portion 82 engaged by a nut 84 releasably holding the tube 70 in engagement with the plate 72.

While present preferred embodiments of the invention have been illustrated and described, it will be recognized that the invention can be otherwise variously embodied and practiced within the scope of the following claims.

We claim:
1. An extruder for extruding fluid materials comprising a plurality of nozzles of rectangular cross section secured to a common support in a line closely adjacent each other, each said nozzle having substantially constant cross section from end to end; a plurality of baffle tubes, each said baffle tube extending through said common support and having its outlet end opening into the interior of a said nozzle for delivering fluid material thereto, said outlet end having a diminished transverse aperture formed therein for directing fluid material in the direction of the axis of said baffle tube, said outlet end having a plurality of orifices formed therein extending laterally for directing fluid material laterally of said baffle tube.

2. A baffle tube for receiving frozen dessert from a pressurized source and delivering said frozen dessert to a nozzle, said baffle tube including a cylindrical portion and a discharge end, a pair of deflector plates joined to said cylindrical portion and extending partially across the discharge end of said baffle tube to form an end slot between the edges of said deflector plates, said end slot extending across the center of said discharge end of said baffle tube for directing frozen dessert outwardly from said baffle tube in the direction of the length of said baffle tube, said deflector plates being curved to form a pair of opposed side ports for directing streams of frozen dessert outwardly from the interior of said baffle tube, each said deflector plate having an orifice extending therethrough, said orifices being positioned to direct streams of frozen dessert in directions substantially perpendicular to the streams coming from said side ports.

3. A baffle tube for receiving frozen dessert from a source and delivering said frozen dessert to a nozzle, said tube having a pair of deflector plates extending partially across the discharge end of said tube to form an end slot between the edges of said deflector plates, said end slot extending across the cross section of said discharge end of said tube for directing frozen dessert outwardly from said tube in the direction of the length of said tube, each said deflector plate having a pair of ears extending sidewardly from the tube, said deflector plates and their ears being curved to form a pair of opposed side ports for directing streams of frozen dessert sidewardly outwardly from the interior of said tube, each said deflector plate having an orifice extending therethrough, each said orifice being located about midway between the ends of said ears of each said deflector plate, said orifices being positioned to direct streams of frozen dessert in directions substantially perpendicular to the streams coming from said side ports, said tube having a cylindrical portion, a collar surrounding said cylindrical portion, said collar having a beveled portion and a square-threaded portion.

4. An extruder for extruding a continuous column of fluid material, said extruder comprising a nozzle of substantially constant internal cross section, said nozzle being open at one end and closed at the other end; a baffle tube extending through said closed end of said nozzle, said tube having its outlet end opening into the interior of said nozzle for delivering fluid material thereto, said tube having an end opening of area less than the cross sectional area of said tube, said end opening having at least a portion thereof located on the cross section of said tube for directing fluid material outwardly from said tube in the direction of the lengths of said tube and said nozzle, said tube having a plurality of side openings formed therein for directing fluid material sidewardly outwardly from the interior of said tube toward the inner surface of said nozzle.

5. An extruder for extruding fluid material comprising a plurality of nozzles secured to a common support in a line closely adjacent each other, each said nozzle having substantially constant cross section from end to end; a plurality of baffle tubes, each said baffle tube extending through said common support and having its outlet end opening into the interior of a said nozzle for delivering fluid material thereto, each said outlet end having a diminished transverse aperture formed therein for directing fluid material in the direction of the axis of a tube, each said outlet end having a plurality of side openings formed therein extending laterally for directing fluid material laterally of a baffle tube.

6. An extruder for extruding a continuous column of fluid material, said extruder comprising a nozzle of substantially constant internal cross section, said nozzle being open at one end and closed at the other end by a plate; a baffle tube extending through a beveled hole in said plate, said baffle tube having an oppositely beveled element engaging said beveled hole, a nut threadedly engaging said baffle tube and pressing against said plate, said tube having its outlet end opening into the interior of said nozzle for delivering fluid material thereto, said tube having an end opening of area less than the cross sectional area of said tube, said end opening having at least a portion thereof located at the center of said tube for directing fluid material outwardly from said tube in the direction of the lengths of said tube and said nozzle, said tube having a plurality of side openings formed therein for directing fluid materials sidewardly outwardly from the interior of said tube toward the inner surface of said nozzle.

7. An extruder for extruding frozen dessert comprising a plurality of nozzles secured to a common support in a line closely adjacent each other, each said nozzle having substantially constant cross section from end to end; a plurality of baffle tubes, each said baffle tube extending through said common support and having its outlet end opening into the interior of a said nozzle for delivering frozen dessert thereto, each said tube having a pair of deflector plates extending partially across the outlet end of said tube to form an end slot between the edges of said deflector plates, each said end slot extending across the cross section of said outlet end of each said tube for directing frozen dessert outwardly from said tube in the direction of the length of said tube, said deflector plates being shaped to form a pair of opposed side ports for directing streams of frozen dessert outwardly from the interior of each said tube toward the inner surface of a nozzle, each said deflector plate having an orifice extending therethrough, said orifices being positioned to direct streams of frozen dessert in directions substantially perpendicular to the streams coming from said side ports.

8. A baffle tube for receiving fluid material from a pressurized source and distributing said material about all sides of said tube, said baffle tube having an axis, said tube having an end opening of area less than the cross-sectional area of said tube, said end opening being located across the confines of the projected cross-section of said tube, said opening being defined by a pair of downwardly and inwardly extending plates, said plates having a pair of opposite orifices formed therein for directing fluid material sidewardly outwardly from the interior of said tube, said tube also having a pair of opposite ports formed in said plates at positions between said orifices, said ports being adapted to direct fluid material sidewardly outwardly from the interior of said tube in directions angularly displaced around said tube from the directions of fluid material coming from said orifices.

References Cited in the file of this patent

UNITED STATES PATENTS

| | | |
|---|---|---|
| 1,979,649 | Stephenson | Nov. 6, 1934 |
| 2,234,151 | Williams | Mar. 4, 1941 |
| 2,371,532 | McDougal | Mar. 13, 1945 |
| 2,383,949 | Aronson | Sept. 4, 1945 |
| 2,512,506 | Saint Denis | June 20, 1950 |
| 2,537,977 | Dulmage | Jan. 16, 1951 |
| 2,836,333 | Woodel | May 27, 1958 |
| 2,912,169 | Peffer | Nov. 10, 1959 |
| 2,959,361 | Lingis | Nov. 8, 1960 |

FOREIGN PATENTS

| | | |
|---|---|---|
| 12,227 | Great Britain | May 31, 1898 |